H. D. JAMES.
CONTROL SYSTEM FOR ELECTRIC MOTORS.
APPLICATION FILED OCT. 3, 1906.
924,667.
Patented June 15, 1909.
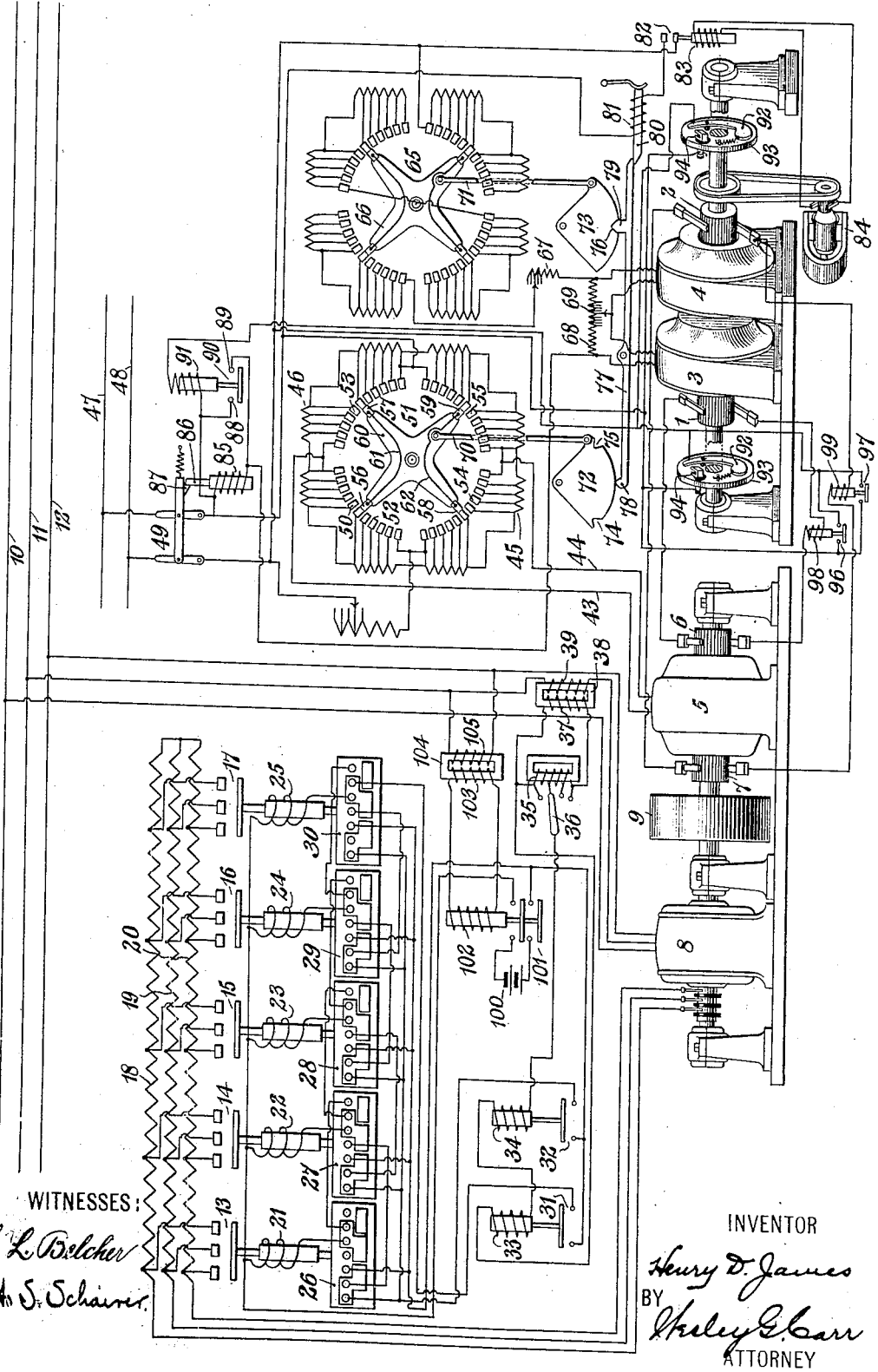
WITNESSES:
C. L. Belcher
Otto S. Schairer
INVENTOR
Henry D. James
BY
Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM FOR ELECTRIC MOTORS.

No. 924,667.      Specification of Letters Patent.      Patented June 15, 1909.

Application filed October 3, 1906. Serial No. 337,280.

*To all whom it may concern:*

Be it known that I, HENRY D. JAMES, a citizen of the United States, and a resident of Pittsburg, in the county of Allegheny and State of Pennsylvania, have invented a new and useful Improvement in Control Systems for Electric Motors, of which the following is a specification.

My invention relates to control systems for electric motors, and particularly to those in which the speed and direction of rotation of the motors are governed by adjusting the field excitation of the generators supplying them with energy.
The object of my invention is to provide means whereby the operation of systems of the character indicated may be improved and be rendered more reliable than has heretofore been the case, and whereby the motors and other devices in the system may be protected from injuries resulting from abnormal conditions.

When electric motors are employed to operate large variable loads, they are frequently governed as to their speed and direction of rotation by adjusting the field strengths and polarities of the generators supplying them with energy, and further variations in speed are often effected by means of rheostats in the field circuits of the motors.

According to the present invention, too rapid acceleration in the speed of the motor is prevented by preventing movement of the motor field rheostat from its initial position until the generator field has been strengthened to a predetermined value, and also until the motor has attained a predetermined speed. Movement of the generator field rheostat is likewise prevented after the motor field rheostat has been moved from its initial position.

The invention further provides means for interrupting the field circuit of the generator when the current in the motor field winding falls below a predetermined amount; when the speed of the motor exceeds a predetermined value, and when the current supplied by the generator to the motor exceeds a predetermined amount.

The single figure of the accompanying drawing is a diagrammatic view of a control system that embodies my invention.

The rotatable members 1 and 2 of motors 3 and 4 are mechanically connected together and may be also mechanically connected to a variable load, such as hoisting machinery or a rolling mill. The members 1 and 2 are supplied with current from a direct current generator 5 having two commutators 6 and 7 to which the respective members 1 and 2 of the motors are electrically connected. The armature of the generator 5 is driven by means of an alternating current induction motor 8
that also drives a heavy fly-wheel 9, the primary member of the motor being supplied with current from any suitable source or circuit, such as that comprising conductors 10, 11 and 12. The speed of the motor 8 is governed automatically by means of a plurality of separately actuated switches 13, 14, 15, 16 and 17, whereby the amounts of resistances 18, 19 and 20, that are included in circuit with the secondary member of the motor, may be adjusted. The switches 13 to 17, inclusive, are provided with operating or controlling magnet windings 21, 22, 23, 24 and 25, the circuits of which are controlled by interlocking switches 26, 27, 28, 29 and 30, and two relay switches 31 and 32, the movable members of said interlocking switches being so connected to the corresponding movable members of the switches 13 to 17 as to be actuated with them. The relay switches 31 and 32 are provided with operating magnet windings 33 and 34, respectively, that are supplied with current from an auto-transformer winding 35, the active length of which may be varied by means of a controller 36, for the purpose of adjusting the current values at which the switches 31 and 32 will be operated by means of their respective magnet windings. The auto-transformer 35 is connected to the secondary winding 37 of a series transformer 38, the primary winding 39 of which is included in circuit with one of the conductors by means of which the primary member of the motor 8 is connected to the distributing circuit. The switches 31 and 32 are so adjusted that the switches 13 to 17, inclusive, will be operated to insert resistance in or remove it from the secondary circuit of the motor 8 according as the load provided by the generator 5 exceeds or falls below predetermined amounts, the speed of the motor being allowed to decrease when the generator load exceeds a predetermined value, so that the kinetic energy of the fly-wheel 9 may be yielded for the purpose of supplementing the power supplied by the motor 8, and so that when the generator load is light the motor 8 may increase in speed and cause energy to be stored in the fly-wheel 9. In this manner, the amount of current derived from the distributing circuit 10—11—12 may be maintained substantially constant and prevented from exceeding a predetermined value, the details of the operation of this portion of the system being here mentioned only briefly because the same are fully set forth in a separate application, Serial No. 337,278, filed by me of even date herewith.

The respective terminals 43 and 44 of the field magnet winding of the generator 5 are connected to the middle or other normally equi-potential points of two sub-divided resistances 45 and 46 that are connected in parallel relation to a direct current distributing circuit, comprising conductors 47 and 48, by means of a circuit-breaker 49. The several points of sub-division of the resistances 45 and 46 are connected to a plurality of stationary contact terminals 50 of a controller 51, the contact terminals being arranged in four groups 52, 53, 54 and 55 with which four brushes 56, 57, 58 and 59, upon the extremities of a four-armed movable member 60, are adapted to engage. The brushes 56 and 57 are connected by means of a conductor 61; and the brushes 58 and 59 are similarly connected by means of a conductor 62, and the direction and value of the drop of potential in the field magnet winding of the generator 5 may be adjusted by rotating the movable bracket 60 to the right or to the left the desired amount. In this manner, the polarity and field strength of the generator may be adjusted to control the direction and value of the voltage applied by the generator to the members 1 and 2 of the motors and thus effect adjustment of the direction of rotation and speed of operation of the motors. The controller here shown and described forms the subject-matter of another application, Serial No. 337,279, filed of even date herewith, and it is consequently deemed unnecessary to set forth more in detail its structure and mode of operation.

Adjustment of the speed of the motors may be further effected by means of a rheostatic controller 65 that is connected between the field magnet windings of both of the motors and the distributing circuit conductors 47 and 48. The controller 65 comprises a four-armed member 66 and its mechanical structure is otherwise similar to that of the controller 51, though the arrangement and connections of the resistances are substantially as set forth in Patent No. 610,124, granted to Westinghouse Electric & Manufacturing Company, as assignee of Harry P. Davis.

Permanent adjustment of the speed characteristics of the motors 3 and 4 may be effected by means of an auxiliary resistance 67, and the motors 3 and 4 may be caused to operate at exactly the same speed and under similar conditions by means of a comparatively high resistance 68 that is connected in parallel relation thereto, and an intermediate point 69 of which is connected to terminals of the field magnet windings of the motors.

The movable members 60 and 66 of controllers 51 and 65 are connected, respectively, by means of rods 70 and 71 to sector-shaped cams 72 and 73, the former of which is provided with notches 74 and 75 near the extremities of its arc-shaped edge, and the latter of which is provided with a notch 76 at approximately the middle of its arc-shape edge. A bar 77 is pivoted intermediate the cams 72 and 73 and is provided at its extremities with projections that are adapted to fit into the notches in the cams, the parts being so proportioned and arranged that when the projection at one end of the bar engages the arc-shaped edge of the corresponding cam, the projection at the other end of the bar is located in a notch in the other cam and thereby prevents movement of the cam and of the corresponding controller bracket. Thus, when the member 60 of the generator field rheostat 51 occupies the position shown, i. e., when the field magnet winding of the generator is not excited, movement of the member 66 of the motor field rheostat 65 is prevented. When the member 60 is moved to one of its extreme positions, however, the projection 78 may engage the one or the other of the two notches 74 and 75, and the projection 79 may thus be raised out of the notch 76 in the cam 73 by movement of the member 66 of the controller 65. Such movement, however, will be prevented by an electro-magnetically operated latch 80, until the motors 3 and 4 attain a predetermined speed, said latch having a winding 81, the circuit of which is controlled by means of a switch 82. The switch 82 is provided with an operating magnet winding 83 that is connected to a small magneto-dynamo 84, and becomes sufficiently energized to close the switch and establish the circuit of the magnet winding 81 only when the voltage of the dynamo 84 exceeds a predetermined value, i. e., when the motors have attained a predetermined speed. The latch 80 is then withdrawn and free operation of the bar 77 is permitted.

Included in series circuit with the field magnet windings of the motors 3 and 4 is a magnet winding 85 that maintains a latch 86 in engagement with a stop 87 and thereby prevents opening of the circuit-breaker 49, except when the amount of current traversing the circuit of the field magnet windings of the motors falls below a predetermined value, whereupon the latch 86 drops out of engagement with the stop 87 and permits the circuit breaker 49 to open. The respective terminals of the magnet winding 85 are connected to stationary contact terminals 88 and 89 of a switch 90 having an operating magnet winding 91, the circuit of which becomes established only when the speed of the motors 3 and 4 exceeds such a value that movable members 92 of the one or the other of a pair of centrifugal switches 93, with which the rotatable members of the motors are provided, is caused to engage a stationary contact terminal 94. The magnet winding 85 is thereby shunted and the circuit-breaker 49 is permitted to open.

A pair of switches 96 and 97, that have operating magnet windings 98 and 99 connected in series, respectively, with the conductors by means of which current is supplied to the motors 3 and 4, are employed for establishing the circuit of the magnet winding 91, when the current supplied by the generator to the motors exceeds a predetermined amount, the circuit-breaker 49 being thereby caused to open.

The auxiliary or control circuits of the system are supplied from a battery 100, to which they may be connected by means of a no-voltage relay switch 101 having an operating magnet winding 102 that is supplied from the secondary winding 103 of a transformer 104, the primary winding 105 of which is connected between two of the conductors by means of which current is supplied to the primary member of the motor 8. Thus the control circuits may become established only when the voltage applied to the motor 8 exceeds a predetermined value.

The specific devices which have here been shown and described are only illustrative of suitable means for effecting the results set forth, and other means may obviously be devised and employed without altering the mode of operation of the invention or departing from its spirit, and I desire that all such modifications shall be included within its scope.

I claim as my invention:

1. The combination with a generator and a motor having their armatures electrically connected together, of resistance-varying devices for the circuits of the respective field magnet windings of said machines, and means for preventing operation of the device in the motor field circuit until the device in the generator field circuit has been operated to cause strengthening of the field.

2. The combination with a generator and a motor having their armatures electrically connected together, of resistance-varying devices for the circuits of the respective field magnet windings of said machines, and means for preventing movement of the device in the motor field circuit from its initial position until the device in the field circuit of the generator has been operated to its extreme position.

3. The combination with a generator and a motor having their armatures electrically connected together, of resistance-varying devices for the circuits of the respective field magnet windings of said machines, means for preventing movement of the device in the motor field circuit from its initial position until the device in the field circuit of the generator has been operated to its extreme position, and means for thereafter preventing operation of the latter device unless the former occupies its initial position.

4. The combination with a generator and a motor having their armatures electrically connected together, of resistance-varying devices for the circuits of the respective field magnet windings of said machines, and means for preventing movement of the device in the motor field circuit from its initial position until the device in the field circuit of the generator has been operated to its extreme position and until the motor has attained a predetermined speed.

5. The combination with a generator and a motor having their armatures electrically connected together, of resistances for the circuit of the respective field magnet windings of said machines, means for varying the same, and means for preventing variations of the resistance in the motor field circuit until the resistance in the generator field circuit has been adjusted to obtain a predetermined field strength.

6. The combination with a generator and a motor having their armatures electrically connected together, of resistances for the circuits of the respective field magnet windings of said machines, means for varying the same, and means for preventing variations of the resistance in the motor field circuit until the resistance in the generator field circuit has been adjusted to obtain a predetermined field strength and until the motor has attained a predetermined speed.

7. The combination with a generator and a motor having their armatures electrically connected together, of resistances for the circuits of the respective field magnet windings of said machines, means for varying the same, and means for preventing variations of the resistance in the motor field circuit until the resistance in the generator field circuit has been adjusted to obtain a predetermined field strength, and means for preventing variations of the resistance in the generator field circuit after the resistance in the motor field circuit has been changed from its initial value.

8. The combination with a generator and a motor having their armatures electrically connected together, of means for interrupting the circuit of the field magnet winding of the generator when the motor field magnet winding becomes deënergized.

9. The combination with a generator and a motor having their armatures electrically connected together, of means for interrupting the circuit of the field magnet winding of the generator when the speed of the motor exceeds a predetermined value.

10. The combination with a generator and a motor having their armatures electrically connected together, and means for interrupting the circuit of the field magnet winding of the generator when the current supplied to the motor by the generator exceeds a predetermined amount.

11. The combination with a generator and a motor having their armatures electrically connected together, of regulating devices for varying the strengths of the fields of the respective machines, and means for preventing operation of the motor field-regulating device until the other regulating device has been operated to strengthen the generator field.

12. The combination with a generator and a motor having their armatures electrically connected together, of strength-regulating devices for the fields of said machines, and means for preventing movement of the motor field device from its initial position until the generator field device has been moved to its extreme position.

13. The combination with a generator and a motor having their armatures directly coupled together electrically, of strength-regulating devices for the fields of said machines, and means for so interlocking said devices that neither of them can be operated unless the other is in a predetermined position which will insure safe and satisfactory operation of both machines.

In testimony whereof, I have hereunto subscribed my name this 28th day of September, 1906.

HENRY D. JAMES.

Witnesses:
 EDWIN LEHR,
 BIRNEY HINES.